March 8, 1949.　　　R. A. GROUSE ET AL　　　2,463,765
MANUFACTURE OF ELECTRICAL CONDENSERS
Filed Nov. 6, 1944
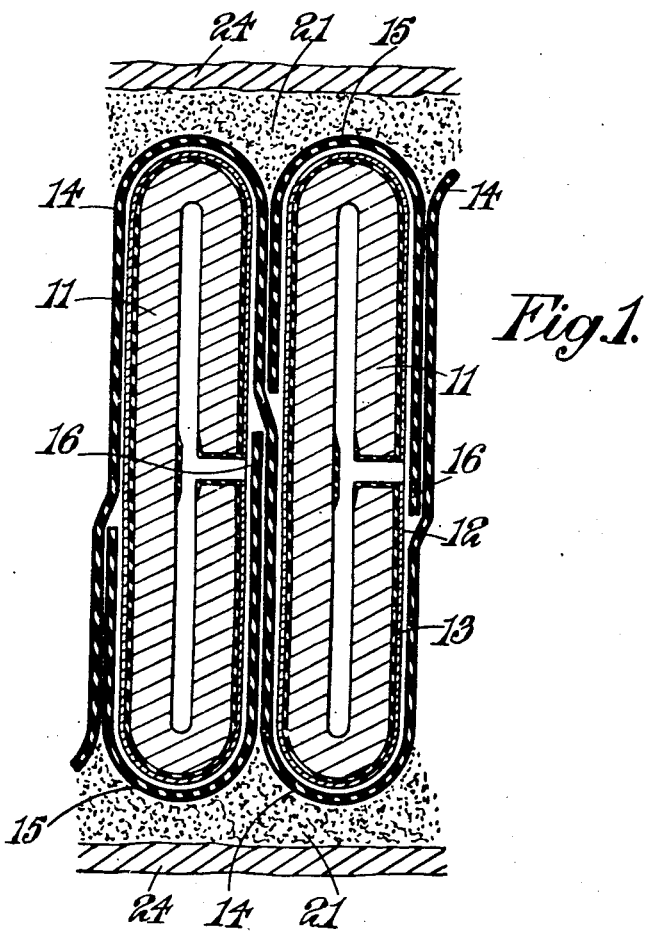
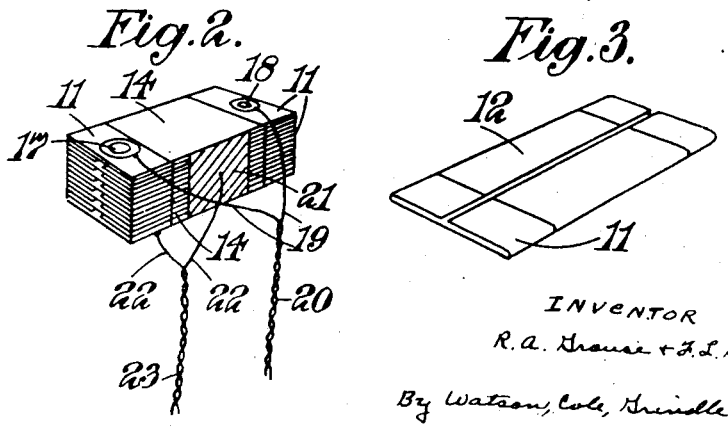
INVENTOR
R. A. Grouse + F. L. F. Bettridge
By Watson, Cole, Grindle + Watson Patented Mar. 8, 1949

2,463,765

UNITED STATES PATENT OFFICE 2,463,765

MANUFACTURE OF ELECTRICAL CONDENSERS

Richard Alfred Grouse and Frederick Leonard George Bettridge, London, England, assignors, by mesne assignments, to A. H. Hunt Limited, London, England, a British company Application November 6, 1944, Serial No. 562,130
In Great Britain April 27, 1943

6 Claims. (Cl. 175—41)

This invention comprises improvements in or relating to the manufacture of electrical condensers.

The invention relates to electrical condensers having oxide dielectric. It is found that the oxide layer formed on aluminium has weak spots which prevents its use on the voltages commonly found in practice, in condensers of ordinary type.

The main object of the present invention is to provide a multilayer condenser with oxide film dielectric, which is self-healing, that is to say, under the conditions of use in the condenser, if the dielectric has any weak spots, a local breakdown causes such a current flow in the metal as will volatilise a small portion thereof around the fault and thereby isolate the fault and restore the condenser to satisfactory operation. By multilayer condenser, is meant a condenser in which, if a section through the condenser be considered, multiple layers of electrodes alternate with each other and with dielectric.

Another object of the invention is to provide a multilayer condenser which can be assembled from units previously manufactured, is self-sealing and has nowhere any voids between the electrodes and the dielectric, that is to say, in which every layer of dielectric which is between electrodes of opposite polarity has these electrodes closely adherent to it.

According to the invention, a process of manufacture of a multilayer self-heating electrical condenser comprises the steps of taking a sheet or strip of aluminium or magnesium or of an alloy predominantly consisting of one or both of these metals, forming an insulating oxide layer upon the front and back faces thereof, depositing by thermal evaporation in vacuo self-healing metal film on the two oxidised faces, assembling compound sheet or strip so produced to form a multilayer condenser, a metal film on the said exposed faces being connected together to form one electrode of the condenser while the sheet or strip constitutes the other electrode.

The process of deposition by thermal evaporation in vacuo enables conducting layers of metal to be deposited which are so thin that they are self-healing—that is to say, under the condition of use in the condenser, if the dielectric has any weak place or places, a local breakdown thereof causes such a current flow in the metal as will volatilise a small portion thereof around the fault and thereby isolate the fault and restore the condenser to satisfactory operation. By depositing the metal films on both faces of the sheet or strip it becomes possible to assemble the compound sheet or strip so produced, consisting of the original metal, thin oxide layers and the deposited metal, in multilayer form without having voids between the electrodes and dielectric anywhere. Thus self-healing condensers of various desired capacities free of objectionable voids can be built up by assembling already-formed compound sheet or strip to the necessary quantity, which is a great advantage in manufacture.

Preferably the sheet or strip is doubled over on itself, the oxide layer and metal film being located on the outer faces thus formed. In this way sharp edges to the sides of the sheet or strip can be obviated, which is an advantage because at sharp edges the oxide layer is liable to be electrically weak.

The multilayer condenser may be assembled either by rolling the compound strip upon itself to produce a number of layers or a plurality of condenser elements may be piled together, each element made as above described, the plurality of sheets or strips which form the basis of each element being connected together to form one electrode and the plurality of metal films deposited upon them being connected together to form the other electrode.

In order to facilitate making electrical connections, sheets of the oxidised and metal-coated material may be taken and piled together with interleaved metal-coated paper, metallised on both faces of the paper, the metallisation on the paper being so thin as not to interfere with the self-healing property of the condenser and electrical connections to the metallised layers being effected through the metallised paper.

The invention includes a self-healing electrical condenser consisting of multiple layers of sheet or strip aluminium or magnesium or of an alloy predominantly consisting of one or both of these metals, covered on front and back faces of each layer with an adherent layer of an oxide formed from the metal strip or sheet and a self-healing metallic coating deposited on the oxide layer.

The following is a description, by way of example, of one form of the process in accordance with the invention and of a condenser produced thereby, reference being made to the accompanying drawing in which:

Figure 1 is a cross-section through two complete layers of the condenser with the thickness of the various parts greatly exaggerated in order to render their relationship to one another more readily visible;

Figure 2 is a perspective view of a completed condenser;

Figure 3 is a diagrammatic detail of one of the elements of the condenser.

In the drawing, Figure 1, 11 represents strip aluminium foil which has been bent over upon itself and flattened. The object of doubling the edges of the strip over in this way is to eliminate external cut edges when the foil is to be covered with oxide, as the oxide insulation is liable to break down at such edges. The foil is taken first in strip form and after bending over as described is passed into a bath which may, for example, consist of sulphuric acid or ammonium borate. In the bath the aluminium strip is made the anode and a suitable cathode is provided. A high current density is employed so as to produce on the exposed surfaces of the strip a coating of aluminium oxide which achieves a suitable thickness within a short time. The strip passes out of the electrolytic bath into a bath of hot water and thence through a drying chamber where it is dried and rewound into a roll. The original thickness of the foil may be of the order of two thousandths of an inch and the thickness of the oxide layer may be, for example, 0.6 thousandth.

The oxide covered foil is then taken and passed through an apparatus where there is condensed upon the surface of the oxide an extremely thin film of metal, preferably aluminium, the metal being deposited by condensation in vacuo. The general method of effecting this operation is described, for example, in British Patent Specification No. 485,965.

The strip is rewound into a roll after being coated with metal and is thereafter cut up into sections, such as the section shown in Figure 3. Either before or after being cut up into sections the deposited metal, which is indicated at 12, Figure 3, is removed over portions of the strip which either constitute the ends of the sections or will constitute the ends after cutting. The method of removal is by passing the material underneath a roller which is maintained at a suitably high potential and which volatilises the metal away where it comes in contact with the roller by reason of the electric current flowing through the metal coating, as described, for example, in United States patent specification Serial No. 507,042, now Patent No. 2,435,441, granted February 3, 1948. The result is the production of a large number of pieces of aluminium foil bent as shown at 11, Figure 3, so as to be doubled upon themselves, coated over their exposed surfaces with an insulating layer of aluminium oxide and coated over the central portion 12 of each section with a further extremely thin layer of condensed metallic aluminium or other metal. The layer of oxide is indicated at 13 in Figure 1 and the layer of metal 12 is also shown by a dark line. It will be appreciated that the deposited aluminium is extraordinarily thin, of a thickness less than one-tenth of a thousandth of an inch and that the insulating layer having been made by oxidation of the aluminium itself has added very little to the thickness of the section so that the total thickness of the completed section will be less than five thousandths of an inch.

Each of the sections 11 shown in Figure 3 in itself constitutes an electrical condenser but in order to afford a condenser of substantial capacity it is necessary to assemble a number of the sections 11 into a stack, as shown in Figure 2, and to provide means whereby the metallised coatings 12 may be all connected efficiently to suitable terminals so that they are in parallel with one another. To spray metal or otherwise bring metal into intimate contact directly with the extremely thin metallised coating 12 would entail the risk of penetrating the aluminium oxide coating beneath it. The elements 11 of the stack are therefore assembled as shown in Figure 1 with an interlayer 14 of metallised paper which is wound to and fro between the layers and which is wide enough to cover the metallised sections 12. The paper 14 is metallised on both faces. This may be effected by the same process as that by which the metallisation 12 was applied. Furthermore strips of metallised paper 15 are laid in each layer so as to cover the alternate edges of the metallisation on the sections 11 where they would otherwise be left uncovered by the paper strip 14. The strips 15 are metallised on their outer faces only and are so laid in the stack that they overlap the gaps between the folded-in edges of the sections 11 as shown at 16 Figure 1. This obviates any risk that the inner metallised face of the paper 14 might by pressure be forced into contact with the metal of the strip 11.

As a result the exterior of exposed edges of all the metal faces 11 is protected by a covering made of the alternate papers 14, 15 and this covering is in metallic connection with the metallised layers 12. The whole stack is united together by punching holes through the unmetallised end portions of the sections 11 and driving in hollow rivets 17, 18 which, owing to the holes having been punched after the stack was assembled, engage fresh aluminium surfaces of each of the sections 11 and make effective electrical connection therewith. Beneath each of the rivets 17, 18 there is secured a terminal wire 19 and the terminal wires are twisted together as shown at 20 to afford a connection to one pole of a condenser.

The exposed edges of the metallised paper strips 14, 17 are sprayed with copper as shown at 21, the area of this copper being prevented from extending as far as the edges of the paper strips. Effective electrical connection with the metallised surface is made by the copper and the paper backing behind it protects the aluminium oxide film on the elements 11. If the metallised surfaces 12 were directly sprayed with copper there would be a great risk of the copper penetrating the oxide layer and short circuiting the condenser. On the sprayed copper surfaces 21 there are then soldered terminal wires 22 which are twisted together, as shown at 23, to provide a connection to the other pole of the condenser. The solder is indicated in Figure 1 by the numeral 24. Each of the two metallised surfaces of the strip 14 makes contact with the metal layers 12 on alternate electrodes; it is necessary therefore to connect together the two metallised surfaces, and this is best effected by spraying both sides of the stack with copper as described and connecting the two layers of sprayed copper together. The inserted strips 15 while preferably metallised on the outer surface as already described may be of insulating material only.

It will be understood that the metallisation on the paper 14 must be so thin as not to interfere with the self-healing quality of the condenser. It will be observed that although there may be voids between the metallisation on the paper and the metal film 12 this is immaterial as the metal film on the paper and the metal film 12 are at the same potential as each other. There are no voids between the film 12 and the dielectric 13 or between the dielectric 13 and the opposite electrode constituted by the metallic strip 11. It is essential that the strip 11 should be coated with dielectric and thereafter with a metal film on both its exposed surfaces as otherwise there will be voids at some place between the dielectric and the nearest conductor of opposite polarity.

The process of producing an anodised film of oxide on aluminium is well known and any of the existing forms of this process may be employed for the purpose of the present invention. The invention is not limited to the use of anodised films, as chemically produced oxide films might alternatively be employed.

While the invention has been described in connection with the production of a stack-type condenser as this is the easiest form of manufacture, bearing in mind the difficulty of making satisfactory connection to the vapour-deposited metal layers on the oxidised strips of aluminium, it will be understood that it would be possible to produce a wound-roll type of condenser if desired.

We claim:

1. A multilayer self-healing electrical condenser wherein the layers are constituted by metal strip material coated with oxide dielectric having a layer of metal less than one tenth of a thousandth of an inch in thickness, deposited on the dielectric, and metallised paper interleaved with the oxide- and metal-coated plate or strip material so as to afford means for effecting electrical connection to the deposited metal without interfering with the self-healing properties thereof.

2. An electrical condenser as claimed in claim 1, wherein the metal strip material is in short sections piled together and the metallised paper comprises a continuous sheet metallized on both surfaces, and is interleaved therewith by winding to and fro between adjacent layers.

3. A process of manufacture of a multilayer self-healing electrical condenser comprising the steps of forming a compound element by taking a thin flat metallic basis made of metal selected from the group consisting of aluminium, magnesium and alloys predominantly consisting of these metals in combination with one another, doubling the side margins of said metallic basis over to meet one another along the line extending along one face of the basis metal, forming an insulating oxide layer on both front and back exposed faces of said metallic basis, depositing by thermal evaporation in vacuo a metal film on both said front and back faces, the metal film being of such thinness as to evaporate without damage to the oxide layers in the event of an electrical fault developing therein, and assembling the resultant flat compound material to form a multilayer condenser, the metal films on the said exposed faces being connected together to form one electrode while the basis metal constitutes the other electrode.

4. An electrical condenser as claimed in claim 1 wherein the edges of the strip are doubled over to meet one another and the entire outside surface of the central portion of the folded strip is coated with oxide and has a layer of metal deposited on the oxide.

5. An electrical condenser as claimed in claim 1 in which the edges of the metallic strip are doubled over to meet one another, the entire outside surface of the central portion of the folded strip is coated with oxide and has a layer of metal deposited on the oxide, and the layers, consisting of short sections of such doubled over strip, are separated by a strip of paper, metallized on both sides, which extends to and fro between adjacent layers, additional layers of paper, metallized on the outer face only, being positioned to cover the edges not covered by the first mentioned paper and the said additional layers covering the joints where the doubled over edges of the metal strips meet.

6. A self-healing electrical condenser consisting, in combination, of multiple layers, each layer consisting of a thin flat metallic basis made of metal selected from the group consisting of aluminium, magnesium and alloys predominantly consisting of these metals in combination with one another, the metallic basis metal having its side margins doubled over inwardly so as to meet one another along the line extending down one face of the basis metal of each layer of the condenser, an insulating oxide layer on both front and back faces of said metallic basis, and a metal film not exceeding one tenth of a thousandth of an inch in thickness upon the oxide layers.

RICHARD ALFRED GROUSE.
FREDERICK LEONARD
GEORGE BETTRIDGE.

REFERENCES CITED

The following references are of record in the file of this patent:

UNITED STATES PATENTS

| Number | Name | Date |
|---|---|---|
| 2,088,949 | Fekette | Aug. 3, 1937 |
| 2,100,045 | Alexander | Nov. 23, 1937 |
| 2,138,892 | Strab | Dec. 6, 1938 |
| 2,171,231 | Braunschweg | Aug. 29, 1939 |
| 2,224,288 | Chapman | Dec. 10, 1940 |

FOREIGN PATENTS

| Number | Country | Date |
|---|---|---|
| 396,453 | Great Britain | Aug. 10, 1933 |
| 503,851 | Great Britain | Oct. 12, 1938 |